United States Patent [19]
Yun

[11] Patent Number: 6,075,623
[45] Date of Patent: Jun. 13, 2000

[54] DOCUMENT PAPER SIZE DETECTION APPARATUS AND METHOD IN FACSIMILE

[75] Inventor: Young-Jung Yun, Kyungki-do, Rep. of Korea

[73] Assignee: SamSung Electronics Co., Ltd., Suwon, Rep. of Korea

[21] Appl. No.: 08/986,689

[22] Filed: Dec. 8, 1997

[30] Foreign Application Priority Data

Dec. 7, 1996 [KR] Rep. of Korea ............. 96-62857

[51] Int. Cl.⁷ .................................................. H04N 1/04
[52] U.S. Cl. ..................... 358/486; 358/488; 358/496; 358/497; 358/498; 358/449
[58] Field of Search ................................. 358/488, 486, 358/449, 498, 497, 496, 401, 474; 355/75, 23, 25, 24; 399/370, 85, 86; 271/144, 241, 171, 3.14, 3.15, 3.17, 13

[56] References Cited

U.S. PATENT DOCUMENTS

| | | | |
|---|---|---|---|
| 4,884,097 | 11/1989 | Giannetti et al. | 355/23 |
| 4,920,384 | 4/1990 | Okamoto | 399/370 |
| 5,379,095 | 1/1995 | Oishi | 358/497 |
| 5,493,417 | 2/1996 | Morikawa et al. | 358/449 |
| 5,598,279 | 1/1997 | Ishii et al. | 358/402 |
| 5,687,010 | 11/1997 | Van Tilborg et al. | 358/496 |
| 5,847,838 | 12/1998 | Takashimizu | 358/401 |

*Primary Examiner*—Edward L. Coles
*Assistant Examiner*—Chewkfan Lee
*Attorney, Agent, or Firm*—Robert E. Bushnell

[57] ABSTRACT

A document paper size detection method and apparatus, in a facsimile device, having a plurality of sensor cells forming a charge-coupled device (CCD) sensor module which is repositioned according to a determination by a CPU as to whether the facsimile is to be operated in a book scanning mode or a sheet feeding mode. In the book scanning mode the CCD sensor module is move to a scan starting position and the scanning operation is performed. In the sheet feeding mode the CCD sensor module is moved to a location for detecting an optical sensor reflecting unit, and based upon an optical alignment of one of the plurality of sensor cells with the optical sensor reflecting unit, a size of the sheet of paper to be scanned in the sheet feeding mode is calculated. The CCD sensor module is then moved to a scanning location for scanning the sheet of paper and the sheet of paper is automatically fed past this scanning location.

7 Claims, 9 Drawing Sheets

DOCUMENT PAPER SIZE DETECTION APPARATUS AND METHOD IN FACSIMILE

CLAIM OF PRIORITY

This application makes reference to, incorporates the same herein, and claims all benefits accruing under 35 U.S.C §119 from an application entitled Document Paper Size Detection Method In Facsimile earlier filed in the Korean Industrial Property Office on Dec. 7, 1996, and there duly assigned Ser. No. 96-62857 by that Office.

BACKGROUND OF THE INVENTION

1. Field of the Invention

The present invention relates to a document paper size detection apparatus and method in a facsimile. Specifically, this invention is a document paper size detection method, wherein a charge coupled device (CCD) module performs two shifting motions for detecting the size of document paper and for reading the document when a document is fed in in a paper feeding unit, and, by using the paper size detected, only valid image signals will be obtained, and the image will be modulated based upon an accurate reduction or enlargement ratio when copied or transmitted.

2. Discussion of Related Art

A typical facsimile, as shown in FIG. 1, consists of a central processing unit (CPU) 10 for controlling overall operation of the facsimile according to a document processing program, a memory 20 for storing a password, a present time, received data, etc., an operating panel equipment (OPE) 30 having a key input unit with many keys, such as a received document output key and numeral keys, for generating signals corresponding to key input, and a display unit for displaying the operation state of the facsimile according to the display data of CPU 10, a scanner 40 for scanning a documenta and converting the image of the document into binary data and sending the data to CPU 10, a MODEM 50 for modulating or demodulating signals which are input to or output from CPU 10, a network control unit (NCU) 60 for communicating with MODEM 50 under the control of CPU 10, a printer 70 for printing the received document, the copied document or other data on paper under the control of CPU 10, a sensor 80 for checking whether there a document to be scanned or sheets of paper to be printed on and sending the result of the check to CPU 10, and speaker 90 for converting voice data into voice signals under the control of CPU 10.

Such conventional facsimiles have different specifications and use various apparatuses and methods for detecting the size of document paper. FIG. 2 shows an example one such apparatus for detecting paper of different sizes, such as A3, B4, Letter and A4. Accordingly, there are four classes grouping document paper according to size in a typical facsimile. If a user moves a right guide 2a6 or left guide 2a8 side to side, the two guides move simultaneously outward or inward the same distance because guide gear 2a10 is engaged with both guides. A pair of sensors 2a2 and 2a4 are engaged with right guide 2a6 for outputting a pair of sensor signals, such as binary values. For example, if the sensors output binary values 00 a detection of paper size A4 is made. Similarly an output of 10 corresponds to a detection of paper size LTR, an output of 01 corresponds to a detection of paper size B4, and an output of 11 corresponds to a detection of paper size A3.

The paper width in a reception unit is usually set to 216 mm(Ltr) or 210 mm (A4), and four classes grouping reduction ratios are employed in a facsimile. Values, which corresponds to the widths of sheets of document paper and is detected by the sensor, are as follows:

TABLE 1

| Width of paper | Reading ratio | Sensor 2a2 | Sensor 2a4 |
| --- | --- | --- | --- |
| A4 ≧ width | 100% | Off | Off |
| A4 ≦ width < B4 | about 85% | On | Off |
| B4 ≦ width < A3 | about 73% | Off | On |
| A3 ≦ width | about 70% | On | On |

The user must adjust the reduction ratio based upon the ratio of the width of document paper to recording paper by setting guides 2a6 and 2a8. If the width of document paper is wider than the recording paper or if guides 2a6 and 2a8 are adjusted incorrectly indicating a document wider in width than the recording paper, there is a problem that a reduction fitting output data to the recording paper is not properly performed, or data is reduced too much to be read.

FIG. 3A and 3B are respectively a sectional view and a plan view of a conventional scanner. As shown in FIG. 3A, the size of document paper is detected without a special sensor. Once a user adjusts a guide 3a6 to a document, a contact image sensor (CIC) 3a18, which is a reading sensor, reads optical sensor reflecting unit 3a16 to detect the size of document paper, before the document reaches a reading location by drive roller 3a12, thus obtaining only valid data, when reading the document, by abandoning portions other than the document paper. Roller 3a14 is a discharge roller for discharging the scanned document from the scanner. If the document paper is slanted because of a mistake in adjusting guide, 2a6, or if the document does not reach the reading location until after the reading operation starts, rib 3a20 or hole 3a22 (FIG. 3B) in the reading unit is read, resulting in a black line on a recording paper. That is, when a portion where the document is not placed is read, light is not reflected, so black is read. Consequently, the edge, leading portion, or rear portion of the recording paper becomes black when printing is completed. When using a white roller, which keeps a regular reading distance and moves the document paper at a regular speed, optical sensor reflecting unit 3a16 cannot discriminate the white paper from the white roller, so the conventional method may not be correctly utilized to detect the size of document paper.

As illustrated, when scanning a document, it is possible to incorrectly adjust the paper guides and thus an error occurs in the reduction ratio according to the ratio of a document paper width to a recording paper size in the conventional method.

SUMMARY OF THE INVENTION

Accordingly, the present invention is directed to a document paper size detection apparatus method in a facsimile that substantially obviates one or more of the limitations and disadvantages of the related art.

An object of the present invention is to provide a method of detecting a size of document paper where stages for detecting the widths of sheets of document paper are divided according to resolutions of a reading sensor.

Additional features and advantages of the invention will be set forth in the description which follows, and in part will be apparent from the description, or may be learned by practice of the invention. The objectives and other advantages of the invention will be realized and attained by the structure as illustrated in the written description and claims hereof, as well as the appended drawings.

To achieve these and other advantages, and in accordance with the purpose of the present invention as embodied and broadly described, a document paper size detection method in a facsimile includes the steps of: detecting a location of an optical sensor reflecting unit attached to a guide; calculating a size of document paper; and reading data on the document paper using a charge coupled device (CCD) module.

It is to be understood that both the foregoing general description and the following detailed description are exemplary and explanatory and are intended to provide further explanation of the invention as claimed.

BRIEF DESCRIPTION OF THE ATTACHED DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF PREFERRED EMBODIMENT

Reference will now be made in detail to the preferred embodiments of the present invention, examples of which are illustrated in the accompanying drawings.

Figure 1:
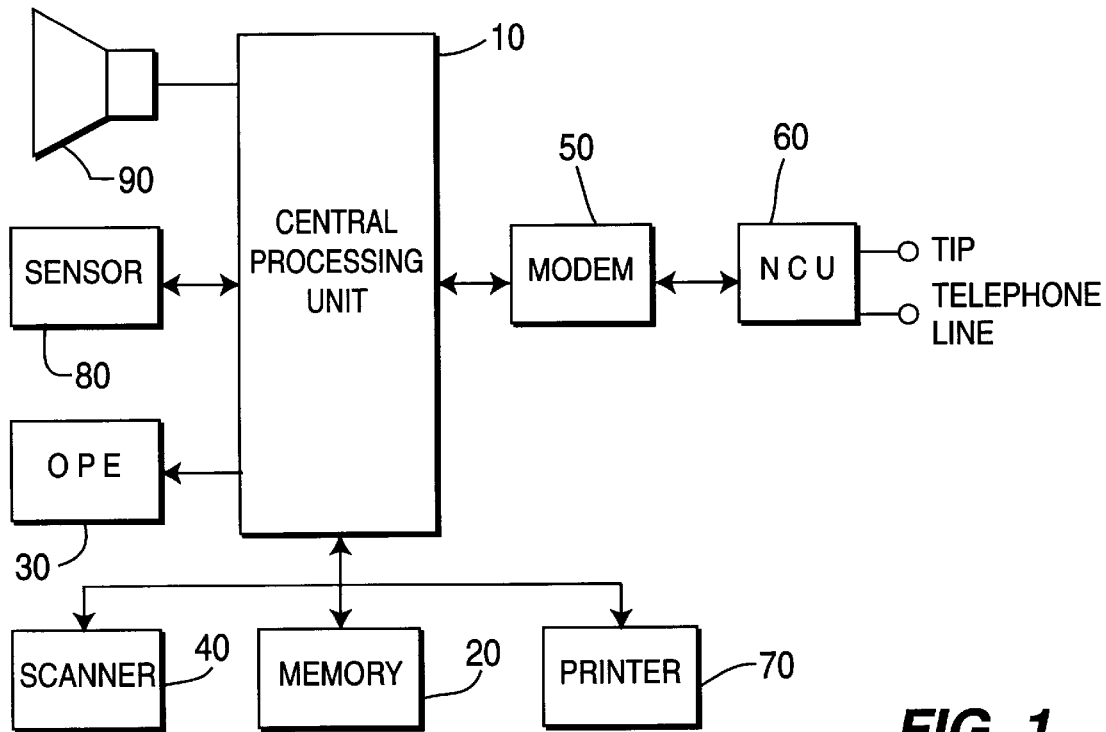
FIG. 1 is a block diagram of a typical facsimile.
Figure 4:
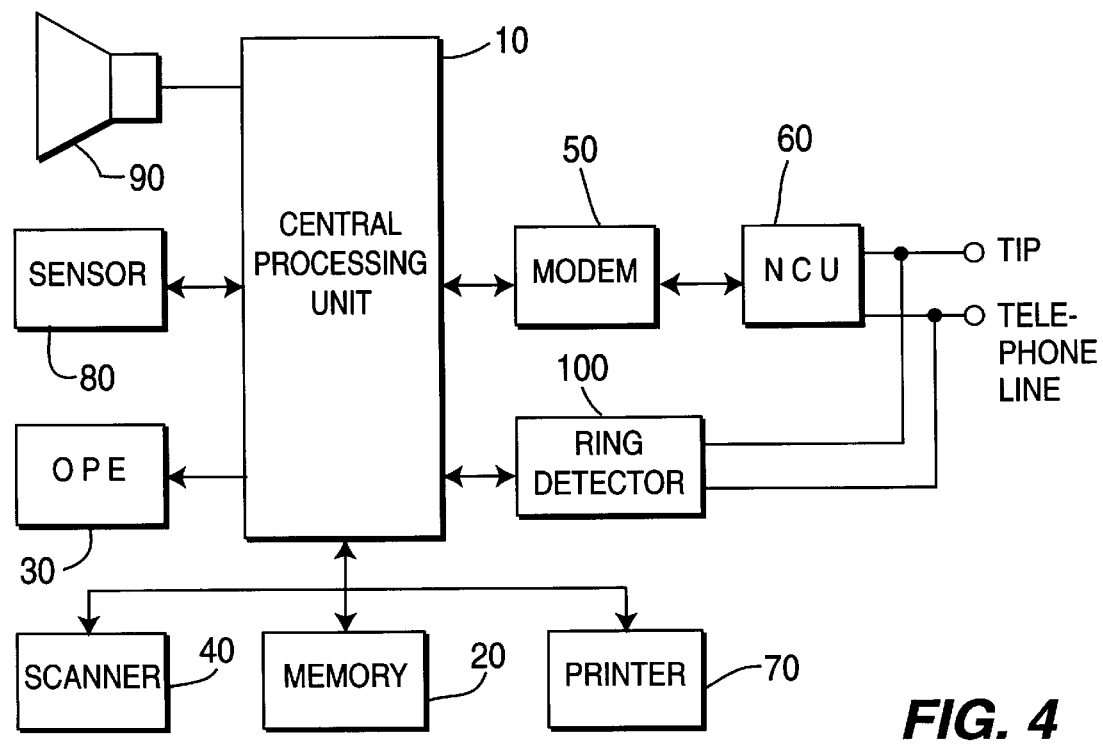
FIG. 4 is a block diagram of a facsimile according to the principles of the present invention.
Figure 2:
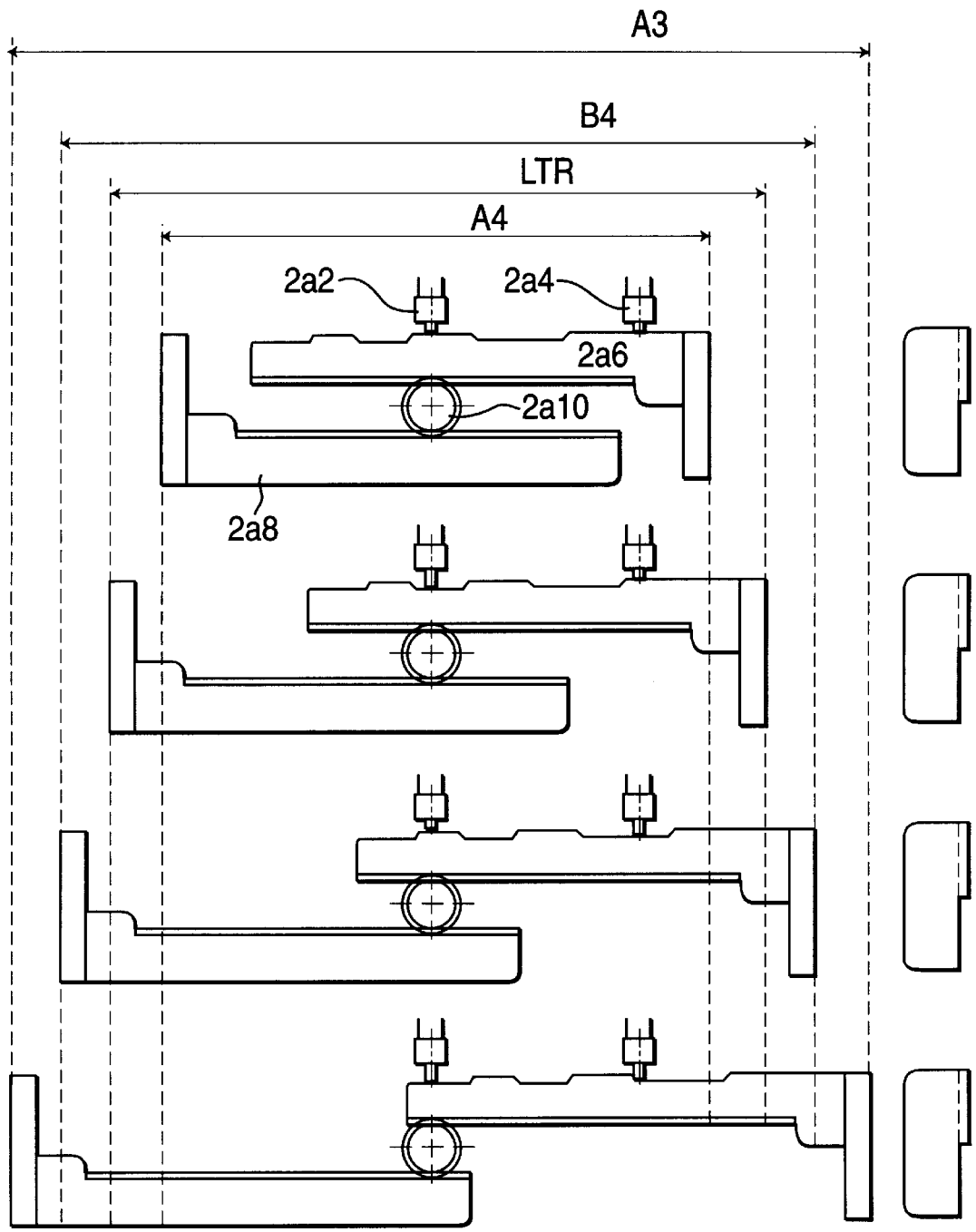
FIG. 2 is a plan view showing a document size detection method in a conventional facsimile.
Figure 3A:
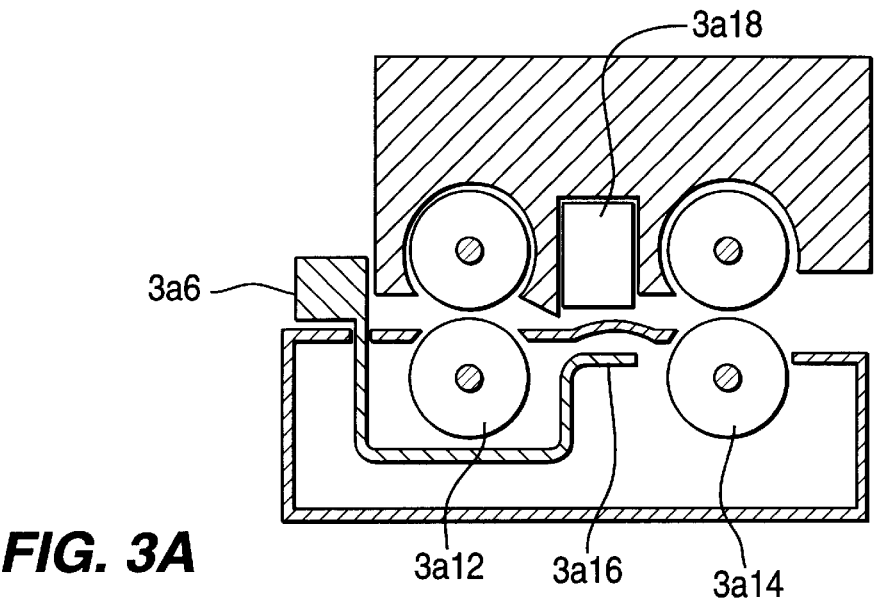
FIGS. 3A and 3B are respectively a sectional view and a plan view of a conventional scanner.
Figure 3B:
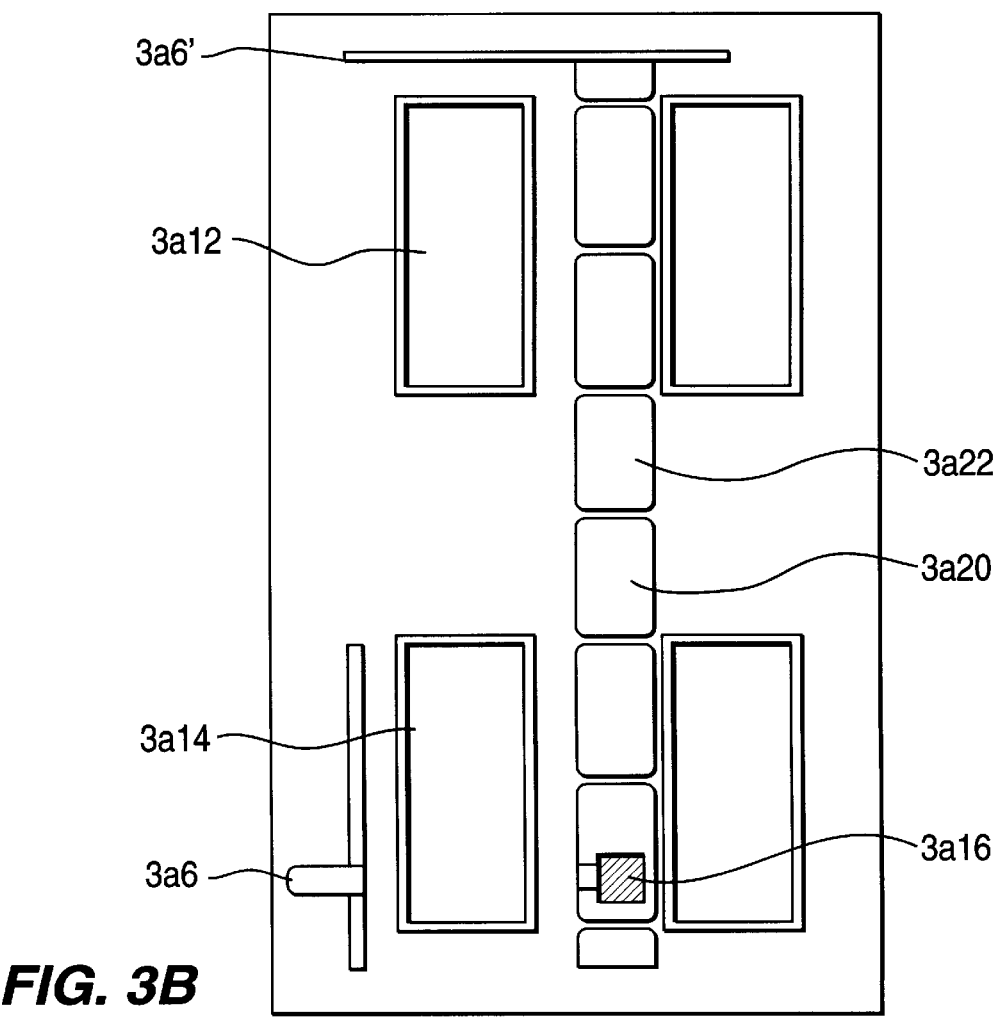

As shown in FIG. 4, the facsimile of this invention consists of: CPU 10 for controlling the overall operation of the facsimile; memory 20 for storing data for operating CPU 10; OPE 30 for displaying the operation state of the facsimile; scanner 40 for converting a document into image data; MODEM 50 for modulating or demodulating the signals input to or output from CPU 10; NCU 60 for communicating with MODEM 50; printer 70 for printing a document or data on recording paper; sensor 80 for checking whether there are any documents and/or recording paper; speaker 90 for converting voice data into voice signals; and a ring detector 100 for detecting a ring input to a telephone line.

Description of the operation of this facsimile is set forth. If voice data is detected through the ring detector, the facsimile outputs the voice data as a voice signal through the speaker. If a user inputs a document in the facsimile, the facsimile displays the document input state through the display device. The document input to the facsimile is converted into image data by the scanner, then the data is modulated or demodulated by the MODEM, before being sent to the CPU. The document which is converted into image data and sent to the CPU is copied according to a password, present time, received data, and other data stored in memory by the MODEM under the control of the CPU, and sent to the NCU. The document data sent to the NCU is sensed by the sensor, which checks whether there are any documents and recording paper. The sensor transmits the result of the check to the CPU. The document data is then printed by the printer under the control of the CPU.

Figure 5A:
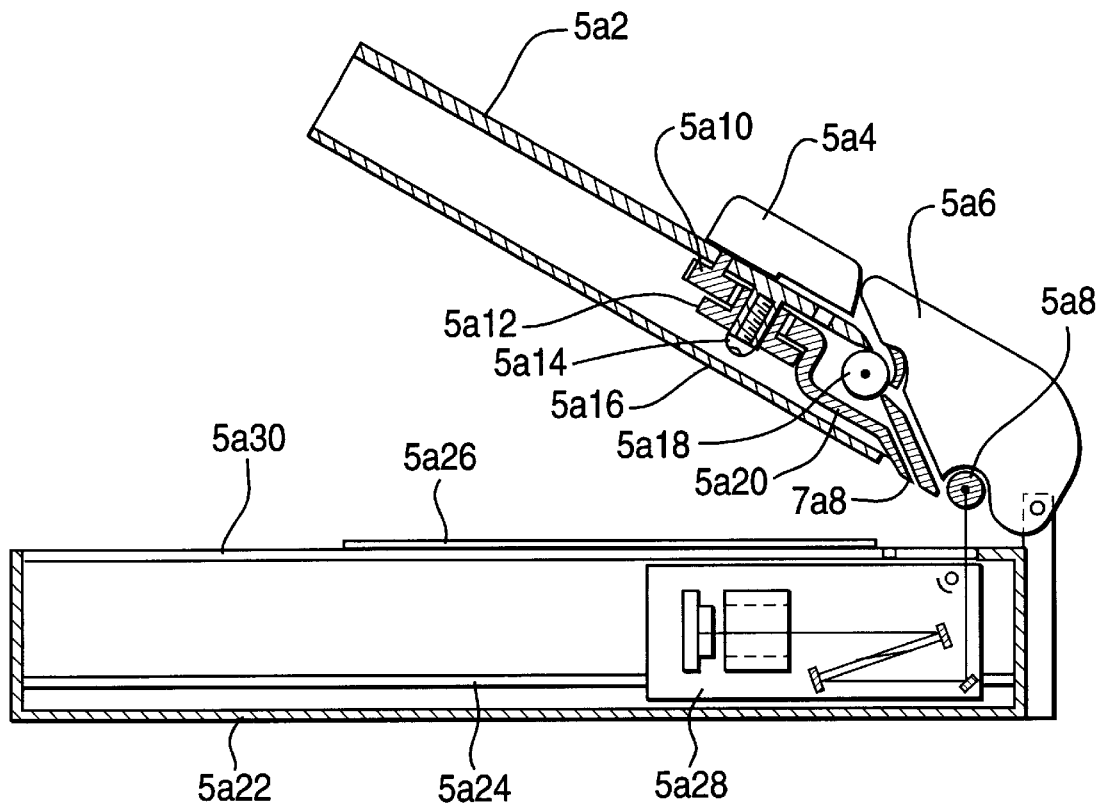
FIG. 5A is a side sectional view of a facsimile with a scan cover opened according to the principles of the present invention.

FIG. 5A is a side sectional view of a facsimile with a scan cover opened. The scanner is largely divided into a scan cover assembly and a scan frame assembly. The scan cover assembly consists of: a drive unit for starting feeding of document paper; and a document cover 5*a*16 for pressing a book when scanning the book or document, wherein cover 5*a*16 provides a reflective white background for those cells of the CCD which extend beyond the boundaries of the the book or document. The scan frame assembly is divided into a CCD module and a drive unit for driving the CCD module.

Figure 7A:
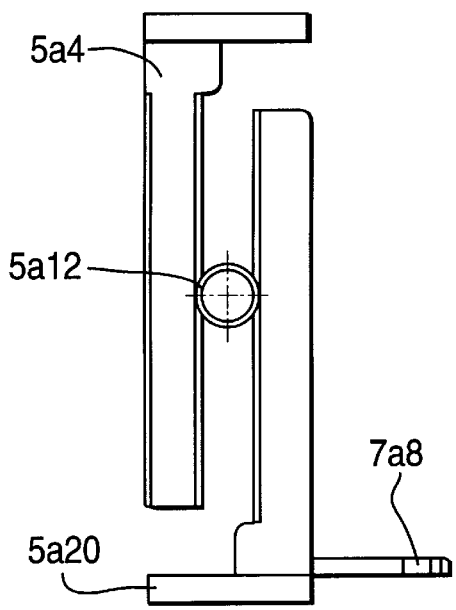
FIG. 7A shows a configuration of a guide and a guide gear according to the principles of the present invention.

The drive unit for feeding the document paper consists of: left document guide 5*a*4 for guiding the document on scan upper 5*a*2; guide gear 5*a*12 for moving right document guide 5*a*20 in the opposite direction to the left document guide in the same distance; screw 5*a*14 for fixing guide gear 5*a*12 to scan upper 5*a*2 to prevent dislocation of the document; optical sensor reflecting unit 7*a*8 attached to the one side of right document guide 5*a*20; auto document feed roller 5*a*18 for feeding the document 5*a*26 (shown in the scanned position); white roller 5*a*8 for keeping a regular reading distance by pressing the document and for moving the document at a regular speed; and scan cover 5*a*6 for fixing white roller 5*a*8. The scan frame assembly consists of: CCD guide shaft 5*a*24 for guiding CCD module 5*a*28 to regularly move in a horizontal direction; scanner frame 5*a*22 for fixing CCD guide shaft 5*a*24; and cover glass 5*a*30 for covering and protecting CCD module 5*a*28. FIG. 7A provides a detailed view of the left and right document guides 5*a*4 and 5*a*20, respectively, as engaged with guide gear 5*a*12.

Figure 5B:
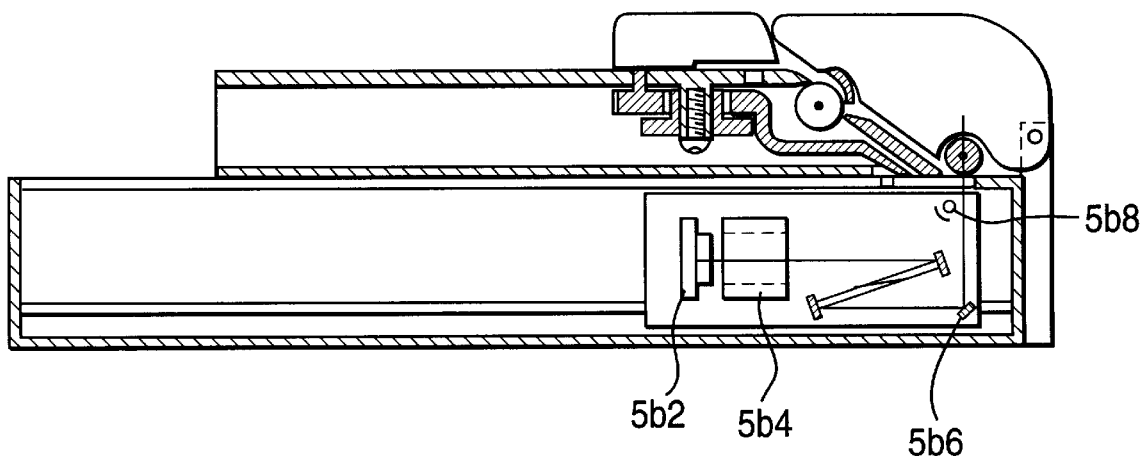
FIG. 5B is a side sectional view of a facsimile with a scan cover closed according to the principles of the present invention.

CCD module 5*a*28, as shown in FIG. 5B, consists of: lamp 5*b*8 for lighting document 5*a*26; mirror 5*b*6 for reflecting the light from the document at a predetermined angle; lens 5*b*4 for reducing the light reflected by mirror 5*b*6 in a predetermined ratio; and CCD sensor 5*b*2 for converting the reduced light into a current signal.

Figure 6A:
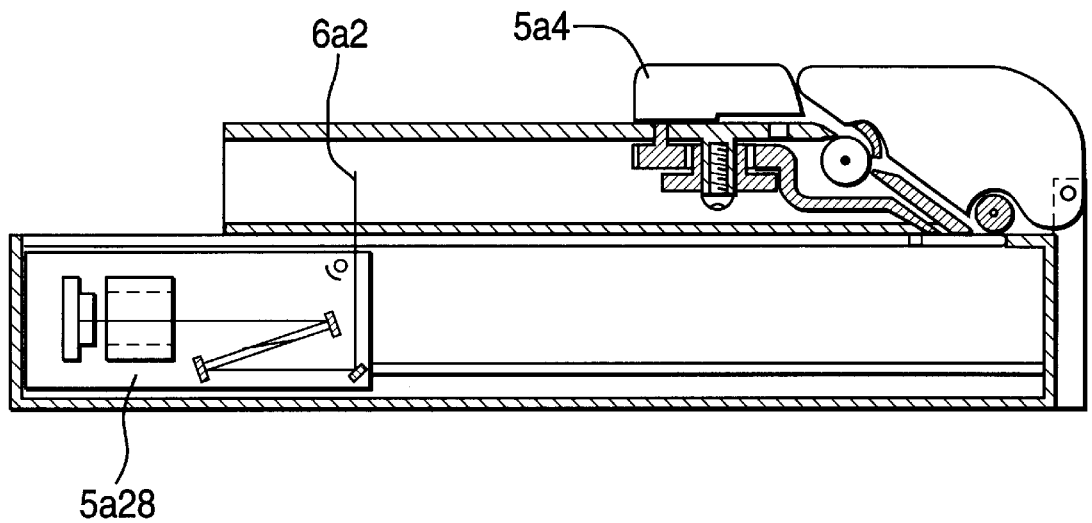
FIG. 6A shows an end location of a CCD module when scanning a book according to the principles of the present invention.
Figure 6B:
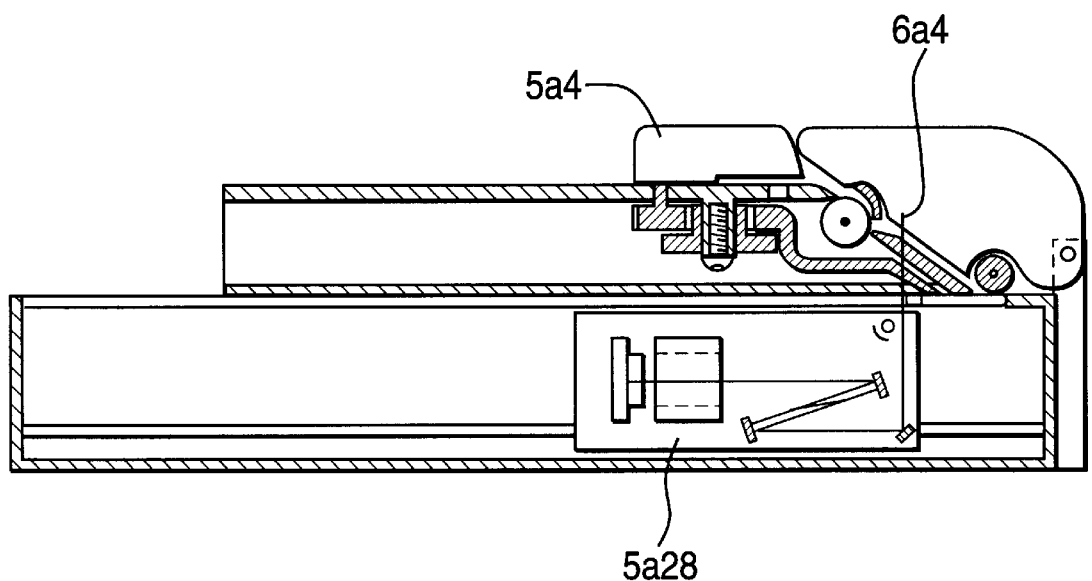
FIG. 6B shows a start location of a CCD module when scanning a book according to the principles of the present invention.

When a user opens the scan cover assembly and places the document 5*a*26, as shown in FIG. 5A, or a book, on glass 5a30 and closes the scan cover assembly as shown in FIG. 5B, then enters a reading start command, CCD module 5a28, as shown in FIG. 6B, starts reading from a scan start location 6a4 and completes reading when it reaches a scan end location 6a2 as shown in FIG. 6A.

Figure 6C:
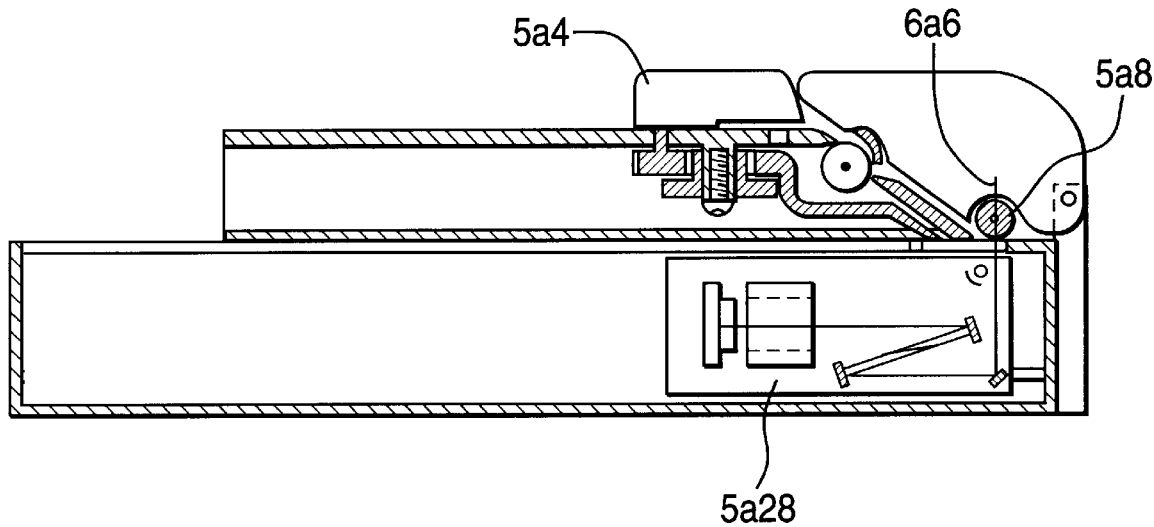
FIG. 6C shows the location of a CCD module when reading a document a sheet feed according to the principles of the present invention.
Figure 6D:
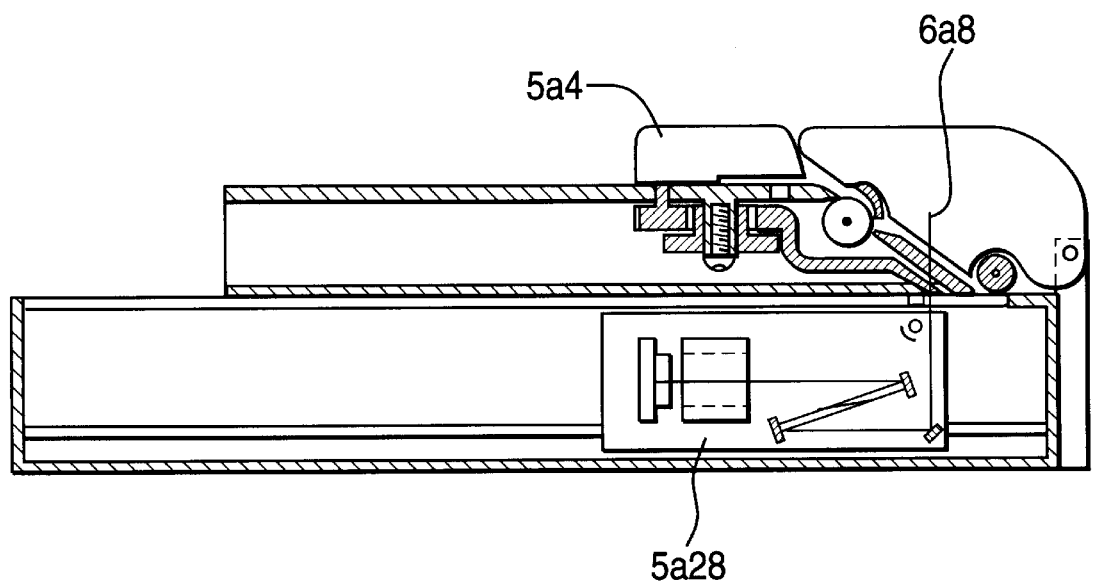
FIG. 6D shows the location of a CCD module when detecting a document paper size before reading the document in a sheet feeding according to the principles of the present invention.
Figure 7B:
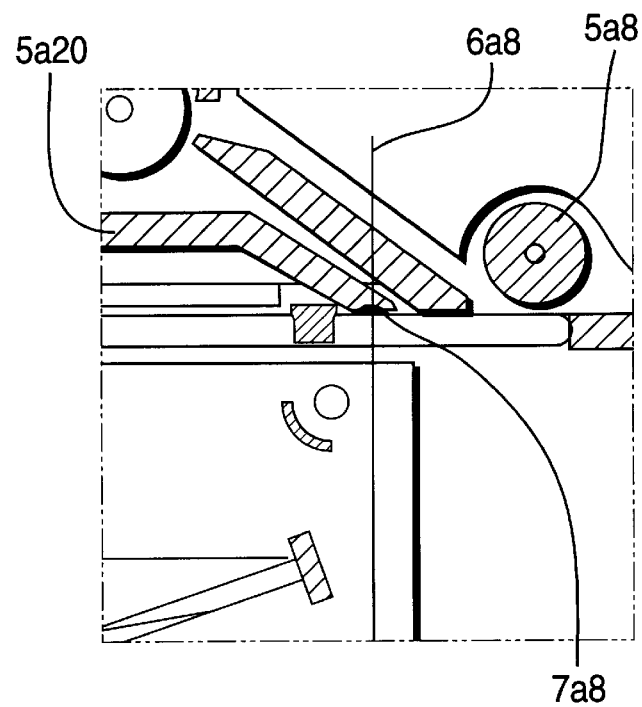
FIG. 7B is a detail view showing the location of a CCD module when detecting a document paper size before reading the document according to the principles of the present invention.
Figure 7C:
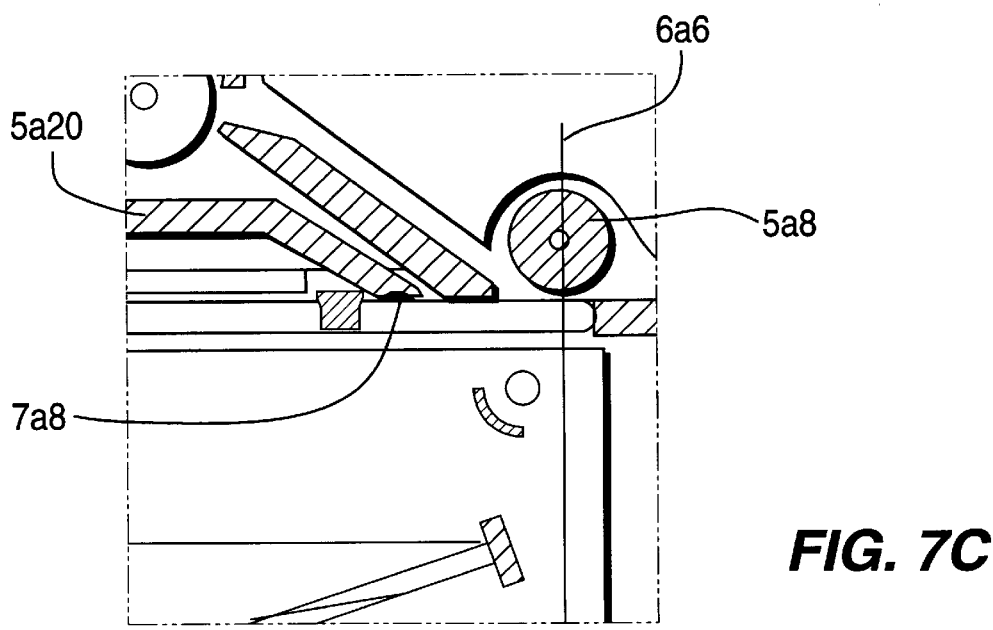
FIG. 7C is a detail view showing the location of a CCD module when reading a document in a sheet feeding according to the principles of the present invention.

When automatically feeding a document through the sheet feeder in the scan cover, the document size is set by moving document guide 5a4 in the right or left direction. Guide gear 5a12 then rotates, and simultaneously optical sensor reflecting unit 7a8, which is attached to the one side of document guide 5a20 engaged with guide gear 5a12, moves until it reaches a predetermined location. Once the reading start command is entered, CCD module 5a28, as show in FIG. 6D and FIG. 7B, is located at a document size sensing location 6a8 and reads optical sensor reflecting unit 7a8. The portion of guide 5a20 other than optical sensor reflecting unit 7a8 does not reflect light, thus being recognized as black. Only optical sensor reflecting unit 7a8 is recognized as white. The CCD sensor cell (pixel) optically alligned with optical sensor reflecting unit 7a8 generates a higher voltage than the other sensor cells, thus the size of the document can be calculated. Once the document size is detected, CCD module 5a28 moves to position 6a6 in FIGS. 6C and 7C and scans white roller 5a8 so that a shading correction operation can be performed. At the same time the document is driven by auto document feed roller 5a18, and as the document is feed past location 6a6 it is read by the CCD.

Figure 8:
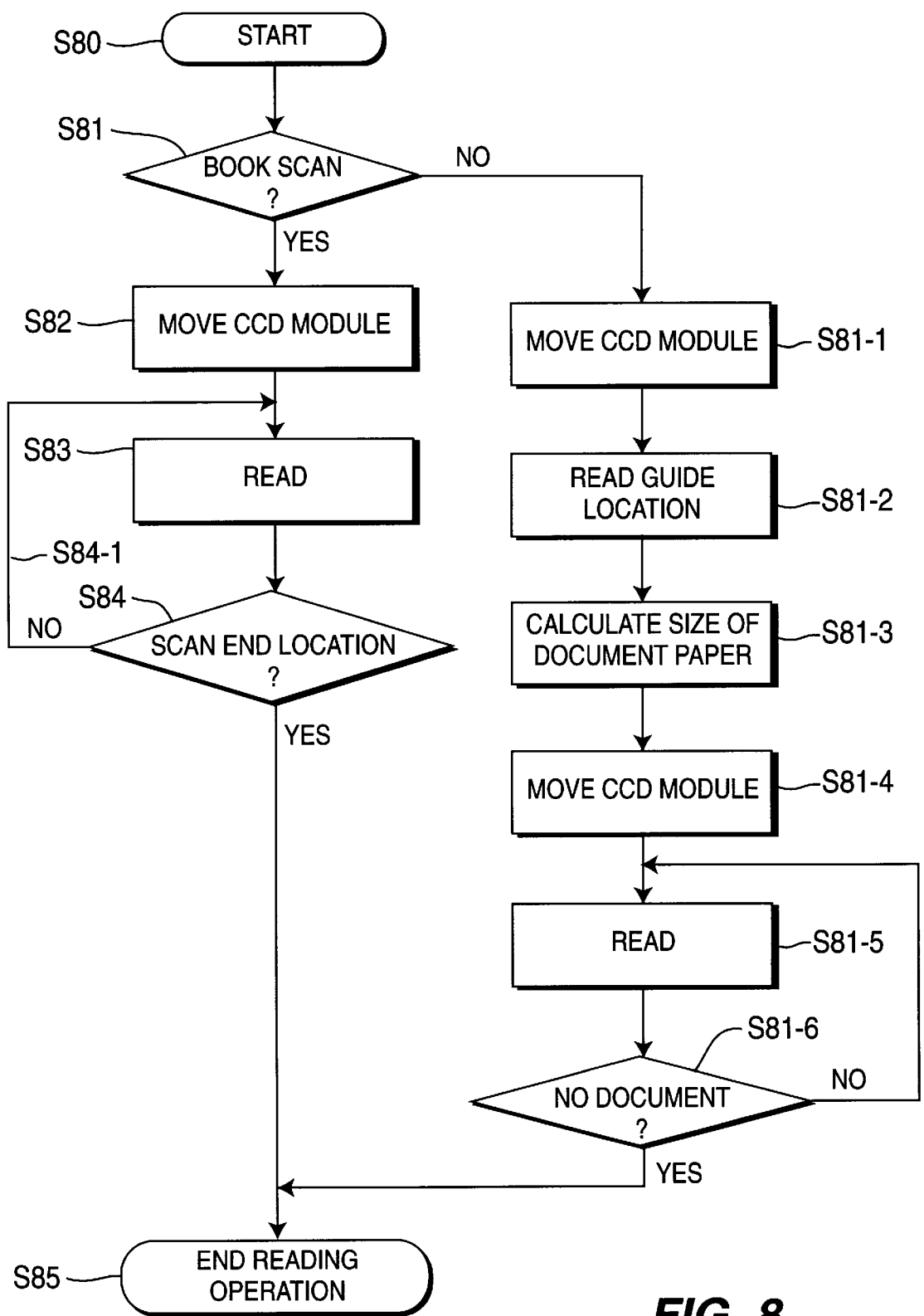
FIG. 8 is a flow chart of a method for sensing the location of a document according to the principles of the present invention.

With reference to FIG. 8, a method of detecting the location of a document is described. The method includes the step of moving the CCD module to perform reading operation after checking which scanning mode is to be performed, i.e., a book scan mode or a sheet feeding mode. In the book scan mode a book or document is placed on glass 5a30 by lifting the scanner cover and in the sheet feeding mode the document is fed through the cover by document feed roller 5a18.

More specifically, once the system starts to detect the location of a document (S80), it is determined which operation will be performed between the book scan mode and the sheet feeding mode (S81). In the book scan mode, the CCD module is moved (S82) to scan start location 6b4 and starts reading (S83). When the CCD module reaches scan end location 6a2 (S84), the reading operation ends (S85). The reading operation is continued (S84-1) until the CCD module reaches scan end location 6a2.

In the sheet feeding mode the CCD module is moved (S81-1) to the location 6a8 for detecting optical sensor reflecting unit 7a8 in order to read the location of document guide 5a4 (S81-2). Then a routine for calculating the size of the document is performed (S81-3), which is described in detail with respect to FIG. 9. After determining the document size, the CCD module moves (S81-4) to the scan start location 6a6 (S81-4), and reads the document (S81-5) being fed by document feed roller 5a18. If it is determined (S81-6) that all the sheets of the document are read, the reading operation ends (S85).

Figure 9:
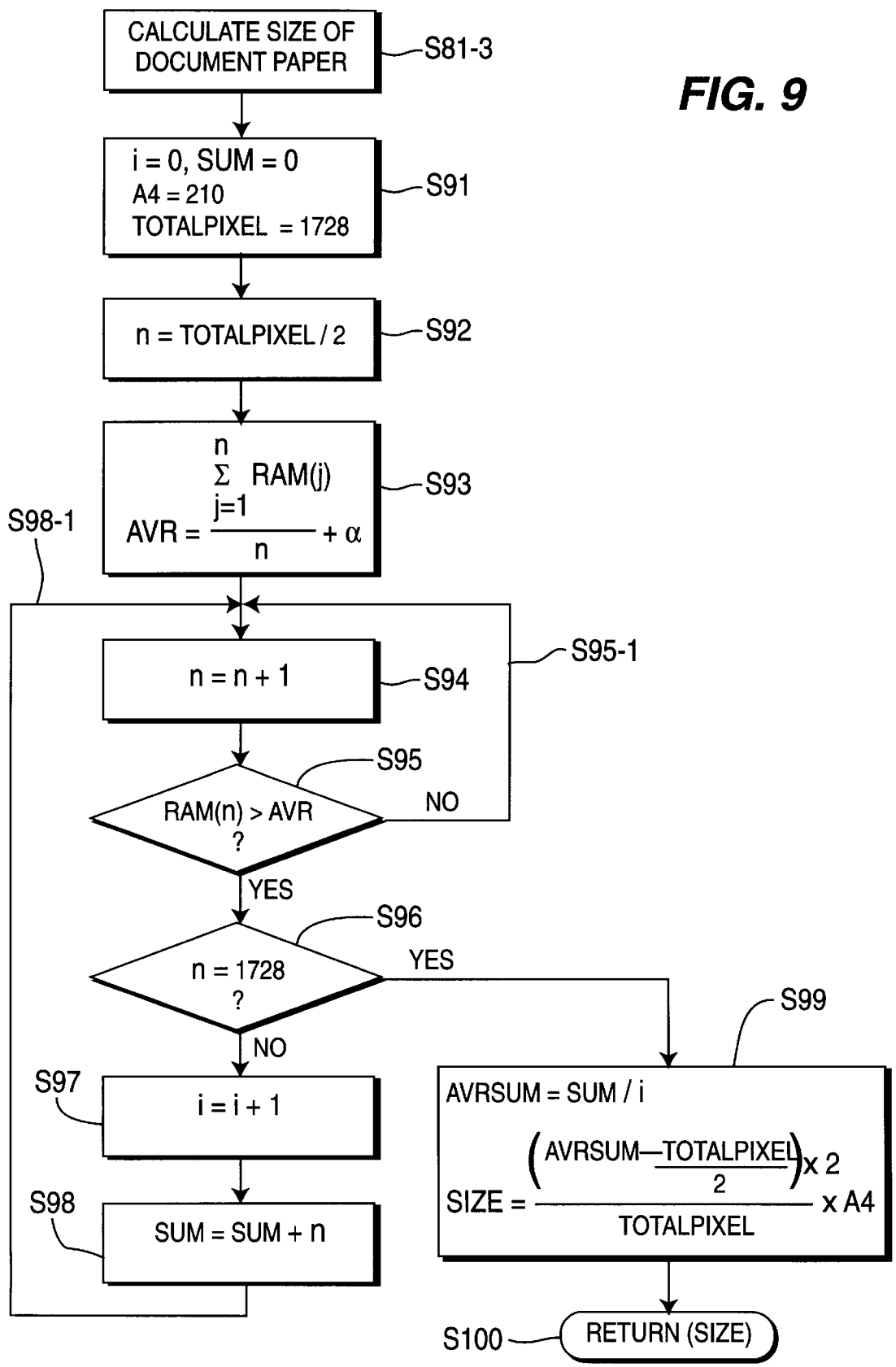
FIG. 9 is a flow chart of a method for calculating the size of document paper according to the principles of the present invention.

The step of calculating the size of document paper (step S81-3), is shown in FIG. 9, and includes the sub-steps of: obtaining an average value which is used as a reference for calculating the document paper size (S91, S92, S93); determining whether the number of valid pixels of a CCD sensor in CCD module 5a28 is detected (S94, S95, S95-1, S96); and calculating the size of the document paper if the number of pixels is equal to the total number of valid pixels of the CCD sensor.

More specifically, in the step of establishing a parameter for calculating the size of the document paper (S91), a pixel count value i, which is a parameter for calculating the average value, which is the reference for calculating the document paper size, and an accumulated value of the pixel count values, SUM, are respectively set to "0". A4 which is the maximum width the paper to be printed on is expressed as 210, and the total number of valid pixels of the CCD sensor is expressed as TOTALPIXEL. This TOTALPIXEL is established as a constant 1728.

Once the parameter for calculating the size of the document paper is established, a central value N of the valid pixels of the CCD sensor is calculated (S92). That is, if the total number of valid pixels (sensor cells) within the width of the CCD sensor is 1728, the central value n of these valid pixels is calculated (S92). In the step of calculating the average of the pixels (S93), with reference to the central value n, the average value, AVR, of the distance to optical sensor reflecting unit 7a8 is obtained. This average value indicates an average value of the distance from the central value of the valid pixels to the location of optical sensor reflecting unit 7a8 when the size of the document paper is A4. An empirical value, caused by sensing error of the CCD sensor, is added to this average value to obtain the AVR.

After obtaining the average value used as the reference value it is determined whether the number of valid pixels of the CCD sensor in CCD module 5a28 is detected. The central value n of the total valid pixels of the CCD sensor is increased by one (1) so that distance to the location of optical sensor reflecting unit 7a8 from central pixel n is counted, and this counted number of the pixels is stored in RAM (S94). After reading the location of optical sensor reflecting unit 7a8, the average value AVR is compared to the count value of n stored in RAM(n) (S95) and steps S94 and S95 are repeated (S95-1) until it is determined that the accumulated value of n is greater than the average value AVR. When it is determined that the accumulated value of n is greater than the average value AVR it is determined whether n is equal to the value 1728, i.e., the tolal pixel value, (S96). When it is determined that n is not equal to 1728, the pixel count value i is increased by one (1) and the accumulated pixel count value SUM is increased by the value n (S97 and S98), then step S94 is repeated (S98-1). When it is determined that n is equal to the value 1728 in step S96, the document paper size is calculated (S99). In step S99, the accumulated count value, SUM, is divided by the pixel count value, i, to obtain an average of the accumulated count value, AVRSUM. After obtaining the AVRSUM, the size of the document paper is calculated from the following formula:

$$SIZE = \frac{(AVRSUM - \frac{1}{2}TOTALPIXEL) \times 2}{TOTALPIXEL} \times A4.$$

As illustrated above, the present invention is a document paper size detection apparatus and method, wherein a charge coupled device (CCD) module performs two shifting motions for detecting the size of document paper and for reading the document when a document is automatically being fed, and, by using the paper size detected, the document can be printed on a recording paper in a proper reduction or enlargement ratio when being copied or transmitted. Additionally, only valid data is transmitted without unnecessary data which is read from the portion beyond the detected document paper width in this invention, thereby improving a transmission speed. It is also possible to omit data at the border of the document or in a predetermined range near the border, thus the quality of a copy printed is excellent and reliability on products can be improved.

It will be apparent to those skilled in the art that various modifications and variations can be made in a document paper size detection method in a facsimile of the present invention without deviating from the spirit or scope of the invention. Thus, it is intended that the present invention cover the modifications and variations of this invention provided they come within the scope of the appended claims and their equivalents.

What is claimed is:

1. A document paper size detection method in a facsimile, comprising the steps of:

determining whether said facsimile is operating in a book scanning mode or a sheet feeding mode;

moving a charge coupled device (CCD) module, having a CCD sensor therein, to a scan starting position when it is determined that said facsimile is operating in a book scanning mode;

performing a scanning operation until said CCD module reaches a scan end position;

moving said CCD module to a location for detecting an optical sensor reflecting unit attached to one end of an adjustable paper guide when it is determined that said facsimile is operating in said sheet feeding mode;

calculating, based upon an optical alignment of said optical sensor reflecting unit with one of a plurality of sensor cells of said CCD sensor, a paper size of a sheet of paper to be scanned in said sheet feeding mode;

moving said CCD module to a location for scanning said sheet of paper;

feeding said sheet of paper past said location for scanning said sheet of paper and scanning said sheet of paper;

determining whether another sheet of paper is to be scanned;

repeating said feeding step until it is determined that there are no more sheets of paper to be scanned.

2. The method as set forth in claim 1, said calculating step comprising the sub-steps of:

determining an average distance from a central one of said sensor cells of to said one of said sensor cells of said CCD sensor;

determining an actual distance from a central one of said sensor cells of to said one of said sensor cells of said CCD sensor by increasing a count value of said central one of said sensor cells by one;

comparing said average distance to said actual distance and repeating said step of determining an actual distance until said actual distance is greater than said average distance;

determining whether a valid number of said sensor cells of said CCD sensor are detected when said actual distance is determined to be greater than said average distance; and calculating said paper size when it is determined that said total number of said sensor cells of said CCD sensor are valid.

3. The method as set forth in claim 2, said step of determining whether a valid number of said sensor cells of said CCD sensor are detected comprising a step of determining whether said actual distance is equal to a predetermined value.

4. The method as set forth in claim 1, said calculating step comprising the sub-steps of:

setting a pixel count value to zero;

setting a sum value to zero;

setting a paper size value to a size of a paper to be printed on;

setting a total pixel value to a value equal to a number corresponding to said plurality of sensor cells of said CCD sensor;

setting a count value to one-half said total pixel value;

determining an average distance from a central one of said sensor cells of to said optically aligned one of said sensor cells of said CCD sensor;

increasing said count value by one;

storing said count value as an actual distance value in a memory;

comparing said actual distance to said average distance;

repeating said step of increasing said count value by one when it is determined that said actual distance is not greater than said average distance;

comparing said count value to a predetermined number when it is determined that said actual distance is greater than said average distance;

increasing said pixel count value by one when it is determined that said count value is not equal to said predetermined number;

increasing said sum value by said count value;

repeating said step of increasing said count value by one; and calculating said paper size when it is determined that said count value is equal to said predetermined number, wherein said paper size value is calculated by the steps of:

dividing said sum value by said pixel count value to obtain an average sum value;

dividing said total pixel value by two to obtain an average pixel value;

subtracting said average pixel value from said average sum value to obtain a first result;

multiplying said first result by two to obtain a second result;

dividing said second result by said total pixel value to obtain a third result; and multiplying said third result by said paper size value.

5. A document paper size detection apparatus in a facsimile, comprising:

a central processing unit for controlling operations of said facsimile; and a scanning unit for scanning a document, said scanning unit comprising:

a first user adjustable paper guide;

a second user adjustable paper guide, said second paper guide comprising an optical reflector sensor unit extending therefrom;

a guide gear rotatable about an axis in response to movement of one of said first and second paper guides for moving the other of said first and second paper guides; and a charge couple device (CCD) module having a CCD sensor therein;

said central processing unit determining whether said facsimile is to be operated in a book scanning mode or a sheet feeding mode;

said central processing unit moving said CCD module to a scan starting position when it is determined that said facsimile is to be operated in said book scanning mode;

said central processing unit moving said CCD module to a location for detecting said optical sensor reflecting unit when it is determined that said facsimile is to be operated in said sheet feeding mode;

said central processing unit calculating, based upon an optical alignment of said optical sensor reflecting unit with one of a plurality of sensor cells of said CCD sensor, a paper size of a sheet of paper to be scanned in said sheet feeding mode;

said central processing unit moving said CCD module to a location for scanning said sheet of paper; and said central processing unit controlling said scanner to automatically feed said sheet of paper past said location for scanning said sheet of paper and scanning said sheet of paper.

6. The apparatus as set forth in claim 5, said central processing unit calculates said paper size by determining a count value of a central one of said sensor cells of said CCD sensor, determining an average distance from said central one of said sensor cells of to said optically aligned one of said sensor cells of said CCD sensor, determining an actual distance from said central one of said sensor cells of to said optically aligned one of said sensor cells of said CCD sensor by increasing said count value of said central one of said sensor cells by one, detecting said actual distance is greater than said average distance, detecting when said increased count value is equal to a predetermined value, and calculating said paper size when it is detected that said increased count value is equal to a predetermined value.

7. The apparatus as set forth in claim 6, said central processing unit further calculates said paper size according to the following formula:

$$SIZE = \frac{(AVRSUM - \frac{1}{2} TOTALPIXEL) \times 2}{TOTALPIXEL} \times A4$$

where AVRSUM is equal to a SUM/i, i is a pixel count value initially set to zero and then increased by one each time said central processing unit determines that said increased count value is equal to a predetermined value, SUM is a total pixel count value initially set to zero and then increased by said count value each time said pixel count value i is increased by one, TOTALPIXEL is equal to a total number of valid pixels of said CCD sensor, and A4 is a predetermined paper size value.

* * * * *